(12) United States Patent
Oddsen, Jr. et al.

(10) Patent No.: US 7,677,515 B2
(45) Date of Patent: Mar. 16, 2010

(54) ARM APPARATUS WITH REINFORCEMENT

(75) Inventors: Odd N. Oddsen, Jr., Easton, PA (US); Howard M. Williams, Jr., Emmaus, PA (US)

(73) Assignee: Innovative Office Products, Inc., Easton, PA (US)

(*) Notice: Subject to any disclaimer, the term of this patent is extended or adjusted under 35 U.S.C. 154(b) by 170 days.

(21) Appl. No.: 10/885,854

(22) Filed: Jul. 7, 2004

(65) Prior Publication Data

US 2006/0006297 A1  Jan. 12, 2006

(51) Int. Cl.
*E04G 3/00* (2006.01)
(52) U.S. Cl. .............. 248/274.1; 248/278.1; 248/282.1; 248/284.1
(58) Field of Classification Search .............. 248/284.1, 248/274.1, 278.1, 282.1, 917, 919
See application file for complete search history.

(56) References Cited

U.S. PATENT DOCUMENTS

| | | | |
|---|---|---|---|
| 376,617 A | 1/1888 | Vance |
| 999,283 A | 8/1911 | White |
| 1,551,332 A | 8/1925 | Schramm |
| 2,151,877 A | 3/1939 | Walker |
| 2,488,898 A | 11/1949 | Brasty |
| 3,072,374 A | 1/1963 | Bodian |
| 3,128,982 A | 4/1964 | Christopher |
| 3,131,900 A | 5/1964 | Anderson et al. |
| 3,322,886 A | 5/1967 | Warshawsky |
| 3,348,799 A | 10/1967 | Junkel et al. |
| 3,409,261 A | 11/1968 | Leporati |
| 3,424,419 A | 1/1969 | Siegel |
| 3,436,046 A | 4/1969 | Valeska |
| 3,489,383 A | 1/1970 | Anson |
| 3,886,560 A | 5/1975 | Mortensen et al. |
| 4,034,946 A | 7/1977 | Zimmer, Jr. |
| 4,082,244 A | 4/1978 | Groff |
| 4,146,205 A | 3/1979 | Skinner |
| 4,158,488 A | 6/1979 | Gottschalk et al. |
| 4,159,093 A | 6/1979 | Hamilton |
| 4,166,602 A | 9/1979 | Nilsen et al. |
| 4,266,747 A | 5/1981 | Souder, Jr. et al. |
| 4,381,538 A | 4/1983 | Warshawsky |
| 4,437,638 A | 3/1984 | Scheibenpflug |

(Continued)

FOREIGN PATENT DOCUMENTS

DE  85 30 047 U  5/1986

(Continued)

OTHER PUBLICATIONS

U.S. Appl. No. 10/461,637, filed Jun. 13, 2003, Oddsen, Jr.

(Continued)

*Primary Examiner*—Amy J Sterling
*Assistant Examiner*—Steven M Marsh

(57) ABSTRACT

An extension arm apparatus is provided for mounting devices such as flat panel monitors above a workspace. The apparatus includes upper and lower channels connected to a pair of endcaps. One endcap may connect to the workspace and the other endcap may connect to an extension arm or the to device to be mounted. At least one of the channels includes a reinforcement structure providing additional support to the apparatus. The reinforcement structure is tapered. A forearm extension may also include a reinforcement structure. The endcaps may have interior spacers that provide clearance for the sidewalls of the channels, which may be fabricated without parting lines.

12 Claims, 14 Drawing Sheets

U.S. PATENT DOCUMENTS

| | | | |
|---|---|---|---|
| 4,442,969 A * | 4/1984 | Holden | 229/407 |
| 4,447,031 A | 5/1984 | Souder, Jr. et al. | |
| 4,459,650 A | 7/1984 | Pike | |
| 4,494,177 A | 1/1985 | Matthews | |
| 4,523,732 A | 6/1985 | Biber et al. | |
| 4,562,987 A | 1/1986 | Leeds et al. | |
| 4,564,179 A | 1/1986 | Hollingsworth | |
| 4,610,630 A | 9/1986 | Betush | |
| 4,616,798 A | 10/1986 | Smeenge et al. | |
| 4,687,167 A | 8/1987 | Skalka et al. | |
| 4,695,024 A | 9/1987 | Haven | |
| 4,706,919 A | 11/1987 | Soberalski et al. | |
| 4,708,312 A | 11/1987 | Rohr | |
| 4,744,019 A | 5/1988 | Krogsrud | |
| 4,768,744 A | 9/1988 | Leeds | |
| 4,770,384 A | 9/1988 | Kuwazima et al. | |
| 4,783,036 A | 11/1988 | Vossoughi | |
| 4,821,159 A | 4/1989 | Pike | |
| 4,826,123 A | 5/1989 | Hannah et al. | |
| 4,836,486 A | 6/1989 | Vossoughi et al. | |
| 4,844,387 A | 7/1989 | Sorgi et al. | |
| 4,852,500 A | 8/1989 | Ryburg et al. | |
| 4,852,842 A | 8/1989 | O'Neill | |
| 4,887,929 A | 12/1989 | Hale | |
| 5,032,846 A | 7/1991 | Chang | |
| 5,102,079 A | 4/1992 | Lee | |
| 5,123,621 A | 6/1992 | Gates | |
| 5,174,531 A | 12/1992 | Perakis | |
| 5,186,483 A | 2/1993 | Sheppard | |
| 5,190,803 A | 3/1993 | Goldbach et al. | |
| 5,258,898 A | 11/1993 | Thornton | |
| 5,335,142 A | 8/1994 | Anderson | |
| 5,348,260 A | 9/1994 | Acevedo | |
| 5,357,414 A | 10/1994 | Dane et al. | |
| 5,379,205 A | 1/1995 | Peng et al. | |
| 5,387,255 A | 2/1995 | Chiang | |
| 5,390,685 A | 2/1995 | McCoy | |
| 5,402,973 A | 4/1995 | Haines et al. | |
| 5,429,336 A | 7/1995 | Ko | |
| 5,437,427 A | 8/1995 | Johnson | |
| 5,584,596 A | 12/1996 | Greene | |
| 5,641,147 A | 6/1997 | Pena | |
| 5,642,819 A | 7/1997 | Ronia | |
| 5,661,497 A | 8/1997 | Calearo | |
| 5,664,750 A | 9/1997 | Cohen | |
| 5,697,588 A | 12/1997 | Gonzalez et al. | |
| 5,743,503 A * | 4/1998 | Voeller et al. | 248/284.1 |
| 5,799,917 A | 9/1998 | Li | |
| 5,826,846 A | 10/1998 | Buccieri et al. | |
| 5,848,556 A | 12/1998 | Ryu et al. | |
| 5,876,008 A | 3/1999 | Sweere et al. | |
| 5,924,664 A | 7/1999 | Mileos et al. | |
| 6,012,693 A | 1/2000 | Voeller et al. | |
| 6,076,785 A | 6/2000 | Oddsen, Jr. | |
| 6,095,468 A | 8/2000 | Chirico et al. | |
| D435,852 S | 1/2001 | Oddsen, Jr. | |
| 6,174,585 B1 | 1/2001 | Miles | |
| 6,179,263 B1 | 1/2001 | Rosen et al. | |
| 6,257,538 B1 | 7/2001 | Pangborn et al. | |
| 6,283,428 B1 | 9/2001 | Maples et al. | |
| 6,296,216 B1 | 10/2001 | Law et al. | |
| 6,398,259 B1 | 6/2002 | Palmer et al. | |
| 6,409,134 B1 | 6/2002 | Oddsen, Jr. | |
| 6,419,198 B1 | 7/2002 | Einav | |
| 6,421,979 B1 | 7/2002 | Fischer et al. | |
| 6,478,274 B1 | 11/2002 | Oddsen, Jr. | |
| 6,505,988 B1 | 1/2003 | Oddsen, Jr. | |
| 6,540,855 B1 | 4/2003 | Holmberg | |
| 6,601,811 B1 | 8/2003 | Van Lieshout | |
| 6,609,691 B2 | 8/2003 | Oddsen, Jr. | |
| 6,619,606 B2 | 9/2003 | Oddsen, Jr. et al. | |
| 6,672,553 B1 | 1/2004 | Lin | |
| 6,695,270 B1 | 2/2004 | Smed | |
| D488,163 S | 4/2004 | Hunt | |
| 6,736,364 B2 | 5/2004 | Oddsen, Jr. | |
| 6,799,780 B2 | 10/2004 | Anspaugh et al. | |
| 6,908,132 B2 | 6/2005 | Bauhof | |
| 7,100,880 B2 * | 9/2006 | Oddsen, Jr. | 248/278.1 |
| 2003/0234328 A1 | 12/2003 | Oddsen | |
| 2004/0222344 A1 | 11/2004 | Oddsen | |

FOREIGN PATENT DOCUMENTS

| | | |
|---|---|---|
| EP | 0 508 178 | 10/1992 |
| GB | 2294632 | 5/1996 |
| JP | 10-254581 | 9/1998 |
| JP | 11-085315 | 3/1999 |
| WO | 00/25640 A | 5/2000 |
| WO | 00/73027 A | 12/2000 |

OTHER PUBLICATIONS

Innovation Office Products, Inc. vs. Ole Smed and Trade management Group Limited., Answer of Trade Management Group Limited to Complaint for Patent Infringement, United States District Court, E.D. CA., Case EDCV 07-00192SGL(JCRx).

Innovation Office Products, Inc. vs. SpaceCo, Inc., Memorandum—Mar. 14, 2007, United States District Court, E.D. Pa., Case 05-04037.

Innovation Office Products, Inc. vs. SpaceCo, Inc. and Spaceco Business Solutions, Inc., Defendant's Supplemental Response to Plaintiffs First Set of Interrogatories (Nos. 3-16), United States District Court, E.D. Pa., Case 2:05-cv-04037-LS.

Innovation Office Products, Inc. vs. SpaceCo, Inc., Memorandum—Aug. 23, 2007, United States District Court, E.D. Pa., Case 05-04037.

Global Manufacturing Products sold under the name "Shuttle Plus" (pictures).

Lesco Model L310.

* cited by examiner

A-A

B-B

C-C

D-D

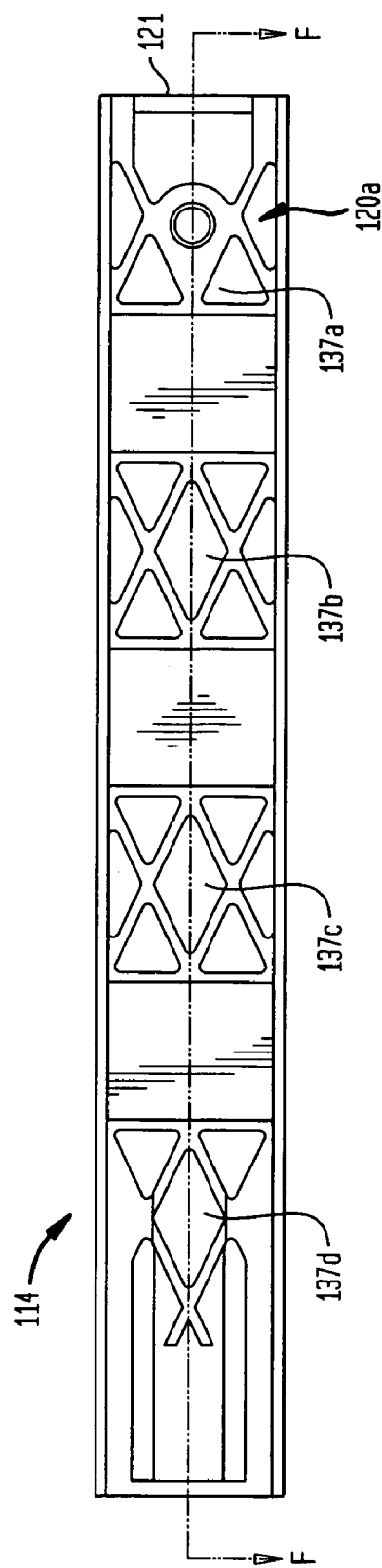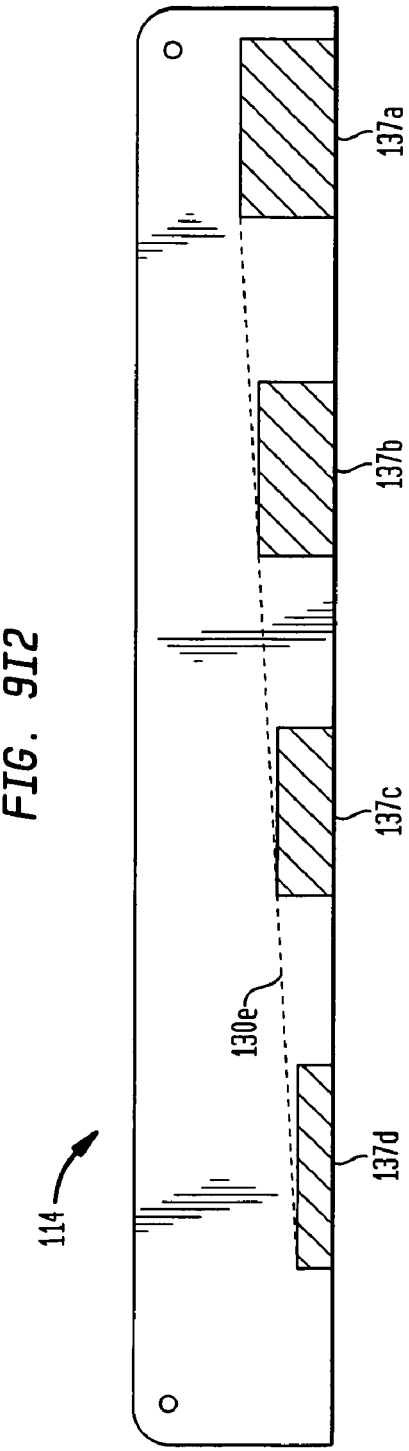
FIG. 9I1
FIG. 9I2

C-C

A-A

B-B

B-B

A-A

ARM APPARATUS WITH REINFORCEMENT

BACKGROUND OF THE INVENTION

The present invention relates to extension arm devices and components therefor. More particularly, the present invention relates to extension arm devices and components therefore having enhanced reinforcement and improved designs.

In the past, people have placed video monitors and other electronic equipment on desks, tabletops, or upon other equipment such as personal computers or workstations. One drawback to these configurations is the reduction in available workspace taken up by the equipment. Another drawback is the inability to place the equipment in a desired location. A further drawback is the potential for eye strain, neck strain and/or a cumulative trauma disorder such as carpel tunnel syndrome from non-ergonomic placement of devices such as monitors and keyboards.

Different products have been provided in order to overcome these obstacles. For example, in one solution, a monitor stand or printer stand elevates the apparatus over other equipment on a desk. While this may free up workspace, it often places the equipment in an undesirable location. Another solution employs a mechanical extension arm to support the monitor. Extension arms free up workspace and allow users to place the equipment where it is wanted. Various extension arm devices are shown and described in U.S. Pat. No. 6,478,274, entitled "Arm Apparatus for Mounting Electronic Devices," and in U.S. Pat. Nos. 6,409,134, 6,609,691, 6,619,606, entitled "Arm Apparatus For Mounting Electronic Devices With Cable Management System," all of which are fully incorporated by reference herein.

FIGS. 1-7 illustrate a known extension arm 10 for mounting an electronic device. As shown in FIG. 1, the main elements of the extension arm 10 are a first endcap 12, an upper channel 14, a lower channel 16, a second endcap 18, and a forearm extension 20. The first endcap 12 has an endcap shaft 22 that is pivotably attachable to a rigid support mount (not shown), such as an orifice sized to accept the endcap shaft 22 or a track configured and sized to engage the grooves on endcap shaft 22. The first endcap 12 is pivotably coupled via pins 24 to both the upper channel 14 and the lower channel 16. The opposite ends of the upper channel 14 and the lower channel 16 are pivotably coupled via pins 24 to the second endcap 18. The forearm extension 20 is pivotably coupled to the second endcap by the endcap shaft 22, which may be a hollow tubular member fixedly attached to the second endcap 18. The forearm extension 20 has a vertically disposed hole 26 therethrough for accepting a shaft 90 of a mounting device (not shown) such as a tilter, platform or other apparatus. The forearm extension 20 includes a hollow interior 92 so that a cable 94 of the mounted device can pass through the forearm extension 20. The cable 94 can extend through hollow tubular member of the second endcap 18. The cable 94 can pass through a sheath or cover 96 attached to the lower channel 16. The hollow interior 92 and/or the sheath 96 hide the cable 94 from view.

The combination of the upper and the lower channels 14, 16 and the first and the second endcaps 12, 18 form an adjustable parallelogram that permits a device coupled to the forearm extension 20 to be raised and lowered to a desirable height. The parallelogram retains its position by employing an extension/retraction means such as a gas spring 28, which is pivotably and adjustably attached to the first endcap 12 and the upper channel 14, as will be further described below. Generally, the gas spring 28, e.g., a gas type hydraulic cylinder and a retractable piston rod, is sized so as to have a fixed length until an upward or downward force is exerted at the second endcap 18 that exceeds the gas spring's designed resistance. Thus, the gas spring 28 causes the parallelogram to retain its position when the only force exerted at the second endcap 18 is the weight of the device, but permits the parallelogram to be adjusted when a user pushes the device coupled to the forearm extension 20 up or down.

FIG. 2 illustrates a side view of the first endcap 12, having the endcap shaft 22 disposed on a first end 30 of the first endcap 12. To provide a rigid connection between the two pieces, the endcap shaft 22 is typically machined from steel and is inserted into the first end 30 during the casting process of the first endcap 12. The endcap shaft 22 has a hole 32 formed in an end of the endcap shaft 22 that is inserted into the first endcap 12. The first endcap 12 is typically fabricated from cast aluminum. The first endcap 12 also has a second end 34 having a hole 36 disposed therethrough. Disposed within the first endcap 12 is a threaded rod 38. A first end 40 of the threaded rod 38 is inserted into the hole 32 at the base of the endcap shaft 22. A second end 42 of the threaded rod 38 is aligned with the hole 36 and is held in place by a clip 44. The clip 44 is fastened to an inner surface of the first endcap 12 by screws 46.

Threadedly mounted on the threaded rod 38 is a clevis 48. FIG. 3 illustrates a sideview of the clevis 48 including a tapped hole 50 in the center thereof. The tapped hole 50 receives the threaded rod 38, as shown in FIG. 2. At a first end of the clevis 48 is a pair of fastening members 52, 54 to which are fastened one end of the gas spring 28. A second end 56 of the clevis 48 is configured to slideably engage a track 58 which is integrally molded in the first endcap 12 (see FIG. 2). The second end 42 of the threaded rod 38 is configured to be engaged by a hex-shaped key, which is inserted through the hole 36 when the second end 42 is properly aligned with the hole 36. The hex-shaped key is employed so as to rotate the threaded rod 38 along its axis of rotation. When the threaded rod 38 is rotated along its axis of rotation, the clevis 48 moves along the length of the threaded rod 38 in a direction that corresponds to the direction which the hex-shaped key is turned. This movement of the clevis 48 permits the gas spring 28 to be adjusted.

FIGS. 4(a) and 4(b) illustrate the upper channel 14, which comprises channel bottom 60 from which extend two channel sidewalls 62. Channel bottom 60 and sidewalls 62 are typically stamped from 13 gauge steel sheet in order to give the upper channel 14 a desired degree of structural rigidity. At each of the ends of the channel bottom 60, a semi-circular region 64 of the sidewalls 62 is cut out to accommodate cold-rolled steel rollers 66, which have a hole 68 therethrough for receiving the pins 24. The rollers 66 are rigidly attached to the upper channel 14 by MIG welding along the edge of the semi-circular cut out region 64 and along the ends of the channel bottom 60. Alternatively, the rollers 66 are integrally cast with the exterior of the upper channel 14 during fabrication.

Additionally, the upper channel 14 comprises stiffener 70, which is welded to an inner surface of the channel bottom 60. Besides providing additional structural rigidity to the upper channel 14, the stiffener 70 has a hole disposed at one end with a threaded ball stud 72 placed within the hole and fixed in place by a nut 74. The ball stud 72 is configured and sized to receive one end of the gas spring 28. The longitudinal centerline 76 of the upper channel 14 is illustrated in FIG. 4(b). FIGS. 4(c) and 4(d) illustrate an alternative upper channel 14'. The upper channel 14' is constructed to optionally include internal reinforcements. This is particularly advantageous when mounting heavy electronic devices to the extension arm, for example, large computer monitors of the CRT type. Internal within the upper channel 14' is a rib assembly including a plurality of cross-ribs 400 and angularly disposed secondary ribs 402. By way of example, the cross-ribs 400 are disposed transverse to the sidewalls 62, while the secondary ribs 402 are disposed at an angle so as to form a triangular internal support structure. The cross-ribs 400 and secondary ribs 402 may be formed as an integral member which can be inserted into the upper channel 14'. Preferably, the cross-ribs 400 and secondary ribs 402 are integrally cast during formation of the upper channel 14'.

FIGS. 5(*a*) and 5(*b*) illustrate the lower channel 16, which comprises a channel bottom 78 from which extend two channel sidewalls 80. As with the upper channel 14, the channel bottom 78 and sidewalls 80 are typically stamped from 13 gauge steel sheet, which is relatively heavy in order to give the lower channel 16 a desired degree of structural rigidity. At opposite ends of the channel bottom 78, a semi-circular region 82 of the sidewalls 80 is cut out to accommodate cold-rolled steel rollers 84, which have a hole 86 therethrough for receiving the pins 24. The rollers 84 are rigidly attached to the lower channel 16 by MIG welding along the edge of the semi-circular cut out region 82 and along the ends of the channel bottom 78. Alternatively, the rollers 84 are integrally cast with the exterior of the lower channel 16 during fabrication. The longitudinal centerline 88 of the lower channel 16 is illustrated on FIG. 5(*b*).

FIG. 6 illustrates the second endcap 18. Unlike the first endcap 12, the second endcap 18 does not have a clevis assembly for attachment to the gas spring 28. The second endcap 18 has an endcap shaft 22 for receiving the forearm extension 20, as illustrated in FIG. 1.

FIG. 7A illustrates the forearm extension 20 having a central arm 89 and first and second ends 91, 95, respectively, attached to the central arm 89. The first end 91 includes an opening 93 for connection with the endcap shaft 22 of the second endcap 18. The forearm extension 20 has a second end 95 with the opening 26 for receiving the shaft 90 of the device mount. An opening 97 is provided for access to the interior 92. As seen in FIG. 7B, there is access to the opening 93 of the first end 91 via region 99, which allows the cable 94 to be hidden from view.

Known extension arms, such as those in FIGS. 1-7, may operate satisfactorily, but may not be well suited for low-cost mass production. For example, the rollers 66 and 84, which are attached to the upper and lower channels 14 and 16, respectively, are either welded or are cast to the exterior of the channels. Welding is costly, time consuming, and typically results in an unpleasing appearance. Casting the roller 66 and/or 84 may result in undesirable parting lines, e.g., marks left on a die casting where the die halves meet, which may be visible to customers or end users. Grinding or sanding can remove parting lines. However, this requires additional time and effort during manufacturing, not to mention the associated cost involved.

Because the upper channel 14 may bear the majority of the weight of the electronic device supported by the extension arm 10, it requires a certain amount of structural support, whether from high grade materials or from the supports discussed above with respect to FIGS. 4(*a*)-(*d*) and FIGS. 18(*a*)-(*b*) of U.S. Pat. No. 6,609,691. High-grade materials can drive up the cost of the device. Additions like the stiffener 70 or the ribs 400 and 402 take up space in the upper channel 14 or 14', and can limit the range of motion of the gas spring 28. This, in turn, limits the range of motion for the extension arm. While it may be possible to lengthen the extension arm, particularly the upper and lower channels 14, 16, the additional size increases cost and may not be practical for small spaces such as a cubicle or shared office.

Thus, there is a need for extension arms that can be fabricated without time consuming and costly manufacturing steps such as welding, grinding or sanding. There is also a need for extension arms having enhanced structural support without impacting size, range of motion or cost.

SUMMARY OF THE INVENTION

In accordance with a preferred embodiment of the present invention, an adjustable extension arm is provided. The arm comprises a first channel member, a second channel member, a first endcap, and a second endcap. The first channel member has a first end and second end opposite the first end. It also has a pair of sidewalls extending from the first end to the second end. The pair of sidewalls has a substantially planar uninterrupted exterior face. The second channel member has a first end, a second end opposite the first end, and a pair of sidewalls extending from the first end to the second end. The first endcap has a first end and a second end. The first end is coupled to the first channel member about the first end thereof and to the second channel member about the first end thereof. The second endcap has first and second ends. The first end is coupled to the first channel member about the second end thereof and to the second channel member about the second end thereof.

In one alternative, the first channel member is an upper channel member and the second channel member is a lower member. In this case, the lower channel member may be partly nested in the upper channel member.

In accordance with another preferred embodiment of the present invention, an adjustable extension arm is provided. The arm comprises a first channel member, a second channel member, a first endcap, and a second endcap. The first channel member has a first end and a second end opposite the first end. It also includes a pair of sidewalls extending from the first end to the second end. The second channel member has a first end, a second end opposite the first end, and a pair of sidewalls extending from the first end to the second end. The first endcap has an interior surface and first and second ends. The first end of the first endcap includes a plurality of bosses contacting the first and second channel members at the first ends thereof. The bosses provide a clearance between the interior surface of the first endcap and the sidewalls of the first and second channel members. The second endcap has an interior surface and first and second ends. The first end of the second endcap includes a plurality of bosses contacting the first and second channel members at the second ends thereof. The bosses of the second endcap provide the clearance between the interior surface of the second endcap and the sidewalls of the first and second channel members.

In an alternative, the first and second endcaps each include at least one stop for arresting movement of an extension and retraction means. In this case, the stops of the first and second endcaps may each include an angled end, wherein the angle permits an enhanced range of motion for the extension and retraction means. Preferably, the angle is between 15 to 75 degrees. In another alternative, the bosses of the first endcap are integrally formed with the interior surface of the first endcap, and the bosses of the second endcap are integrally formed with the interior surface of the second endcap. In a further alternative, the clearance is less than about 3 millimeters.

In accordance with a further preferred embodiment of the present invention, an adjustable extension arm is provided.

The arm comprises a first channel member, a second channel member, a first endcap, and a second endcap. The first channel member has first and second ends opposite one another, and a pair of sidewalls extending from the first end to the second end. The pair of sidewalls each have a substantially planar uninterrupted exterior face. The second channel member has first and second ends opposite each other. It also includes a pair of sidewalls extending from the first end to the second end. The sidewalls include a plurality of bosses adjacent to the first and second ends. The first endcap has interior surface and first and second ends. The first end includes a plurality of bosses. A first pair of the first endcap bosses contact the substantially planar uninterrupted exterior faces of the first channel member about the first end thereof. The first pair of first endcap bosses provide a clearance between the interior surface of the first endcap and the substantially planar uninterrupted exterior faces of the first channel member. A second pair of the first endcap bosses contact a pair of the second channel member bosses adjacent to the first end thereof. The second endcap has an interior surface and first and second ends. The first end includes a plurality of bosses. A first pair of the second endcap bosses contact the substantially planar uninterrupted exterior faces of the first channel member about the second end thereof. The first pair of second endcap bosses provide a clearance between the interior surface of the second endcap and the substantially planar uninterrupted exterior faces of the first channel member. A second pair of the second endcap bosses contact a pair the second channel member bosses adjacent to the second end thereof.

In an alternative, the first and second endcaps each include at least one stop for arresting movement of an extension and retraction means. In this case, the stops of the first and second endcaps may each include an angled end, wherein the angle permits an enhanced range of motion for the extension and retraction means. Preferably, the angle is between 15 to 75 degrees. In another alternative, the bosses of the first endcap are integrally formed with the interior surface of the first endcap and the bosses of the second endcap are integrally formed with the interior surface of the second endcap. In yet another alternative, the clearance is less than about 3 millimeters.

In accordance with another preferred embodiment of the present invention, an adjustable extension arm is provided. The arm comprises a first channel member, a second channel member, a first endcap, and a second endcap. The first channel member has a first end, a second end opposite the first end, a pair of sidewalls extending from the first end to the second end, and a reinforcement structure extending between the pair of sidewalls. The reinforcement structure tapers from the second end to the first end. The second channel member has a first end, a second end opposite the first end and a pair of sidewalls extending from the first end to the second end. The first endcap has first and second ends. The first end is coupled to the first ends of the first and second channel members. The second endcap has first and second ends. The first end is coupled to the second ends of the first and second channel members.

In an alternative, the reinforcement structure is internal to the first channel member. In another alternative, the reinforcement structure extends along at least 50% of the width between the first and second ends of the first channel member. In yet another alternative, the reinforcement structure extends along substantially the entire length between the first and second ends of the first channel member. In another alternative, the reinforcement structure comprises a crossrib structure. In this case, the crossrib structure may include at least one crossrib cell. Preferably, the reinforcement structure includes a series of ribs and spaces between the ribs in alternative structure. In this case, at least one of the ribs may be a spanning member connecting to the pair of sidewalls. More preferably, the spanning member is curved between the sidewalls. The spanning member has a first height along the central region of the first channel member and a second height adjacent to the sidewalls. The second height is greater than the first height.

In a further alternative, the reinforcement structure tapers between 1 and 5 degrees. In another alternative, the reinforcement structure tapers along a central portion of the first channel and does not taper in areas adjacent to the sidewalls of the first channel member. In yet another alternative, the first end includes a central recess for permitting enhanced movement of an extension and retraction means that is at least partly disposed between the first and second channel members.

In another alternative, the adjustable extension arm further comprises a forearm extension coupled to the first and second ends of the second endcap. In this case, the forearm extension may include a forearm reinforcement structure. Preferably, the reinforcement structure is a crossrib structure.

In yet another alternative, the reinforcement structure comprises a plurality of steps between the first and second ends of the first channel member. In this case, each of the steps may have a different height. In another alternative, the first channel member further comprises a ball stud receptacle connected to the reinforcement structure. In another alternative, the first channel member further comprises a ball stud support. The ball stud support includes a support structure connected to at least one of the sidewalls, the first end, or the second end. In this case, the support structure may be integral with the reinforcement structure.

In accordance with yet another preferred embodiment of the present invention, an adjustable extension arm is provided. The arm comprises a first channel member, a second channel member, a first endcap, and a second endcap. The first channel member has a first end, a second end opposite the first end, a pair of sidewalls extending from the first end to the second end, and a reinforcement structure extending between the pair of sidewalls. The reinforcement structure has a first height along the central portion of the first channel member and has a second height in areas adjacent to the sidewalls of the first channel member. The second height is greater than the first height. The second channel member has a first end, a second end opposite the first end, and a pair of sidewalls extending from the first end to the second end. The first endcap has first and second ends. The first end is coupled to the first ends of the first and second channel members. The second endcap has first and second ends. The first end is coupled to the second ends of the first and second channel members.

In an alternative, the reinforcement structure has a curved taper from the second height adjacent to the sidewalls and the first height along the central portion of the first channel member. In this case, the reinforcement structure may further include a longitudinal taper from the first end to the second end. In another alternative, the first channel member further comprises a ball stud receptacle connected to the reinforcement structure. In yet another alternative, the first channel member further comprises a ball stud support. The ball stud support includes a support structure connected to at least one of the sidewalls, the first end, or the second end. In this case, the support structure is preferably integral with the reinforcement structure.

In accordance with yet another preferred embodiment of the present invention, a channel for use in an adjustable extension arm is provided. The channel comprises a body and a reinforcement structure. The body has first and second spaced apart sidewalls and a bottom wall therebetween. The body has a longitudinal axis and spaced apart first and second ends. The reinforcement structure overlies the bottom wall between the spaced apart sidewalls. The reinforcement structure comprises a plurality of ribs extending along the bottom wall between the first and second ends of the body. The ribs vary in height between the first and second ends of the body.

In one example, the ribs taper continuously in height between the first and second ends. In another example, the ribs comprise a plurality of steps between the first and second ends. Each of the steps being of different height. In a further example, the ribs are curved between the sidewalls. In yet another example, the channel further comprises a ball stud receptacle connected to the reinforcement structure. In another alternative, the channel further comprises a ball stud support which includes a support structure connected to at least one of the sidewalls or an endwall. In this case the support structure may be integral with the reinforcement structure.

In accordance with another preferred embodiment of the present invention, a channel for use in an adjustable extension arm is provided. The channel comprises a body and a reinforcement structure. The body has a first and second spaced apart sidewalls and bottom wall therebetween. The body has a longitudinal axis and spaced apart first and second ends. The reinforcement structure has a first height along the central portion of a longitudinal axis and has a second height along the sidewalls. The second height is greater than the first height.

In accordance with yet another preferred embodiment of the present invention, a channel for use in an adjustable extension arm is provided. The channel comprises a body and a reinforcement means. The body has first and second spaced apart sidewalls and a bottom wall therebetween. The body has a longitudinal axis and spaced apart first and second ends. The reinforcement means overlies the bottom wall between the spaced apart sidewalls.

In accordance with a further preferred embodiment of the present invention, a channel for use in an adjustable extension arm is provided. The channel comprises a body, a ball stud support, and a reinforcement structure. The body has a first end, a second end opposite the first end, first and second spaced apart sidewalls extending from the first end to the second end, and a bottom wall therebetween. The body has a longitudinal axis. A ball stud support is integral with the bottom wall. The reinforcement structure is attached to the ball stud assembly and overlies at least a part of the bottom wall. In an example, the reinforcement structure is connected to at least one of the sidewalls, the first end or the second end.

In accordance with another preferred embodiment of the present invention, a channel assembly of upper and lower nested channels for use in an adjustable extension arm is provided. A first one of the upper and lower channels includes a body having a first and second spaced apart sidewalls and a bottom wall therebetween. The body of the first channel has a longitudinal axis and spaced apart first and second ends. It also includes a reinforcement structure overlying the bottom wall between the spaced apart sidewalls. The reinforcement structure comprises a plurality of ribs extending along the bottom wall between the first and second ends of the body. The ribs vary in height between the first and second ends of the body. A second one of the upper and lower channels includes a body having first and second spaced apart sidewalls and a bottom wall therebetween. The body of the second channel has a longitudinal axis and spaced apart first and second ends. The sidewalls of the second channel are spaced so as to nest inside the sidewalls of the first channel. In an example, the first channel is the upper channel and the second channel is the lower channel.

In accordance with a further preferred embodiment of the present invention, a forearm extension for use in an adjustable extension arm is provided. The forearm extension comprises a body, a first coupling, a second coupling, and a reinforcement structure. The body has first and second spaced apart sidewalls and a bottom wall therebetween. The body has a longitudinal axis and spaced apart first and second ends. The first coupling is for attaching to an endcap the adjustable extension arm. The first coupling is connected to the first end. The second coupling is for attaching to a device supported by the adjustable extension arm. The reinforcement structure overlies the bottom wall between the spaced apart sidewalls.

In an alternative, the reinforcement structure comprises a plurality of ribs extending along the bottom wall between the first and second ends of the body. In another alternative, the ribs vary in height between the first and second ends of the body. In a further alternative, the ribs vary in height between a central portion of the body and the sidewalls. The ribs have a first height along the central region and a second height adjacent to the sidewalls. The second height is greater than the first height.

In another alternative, the sidewalls are symmetrical about the longitudinal axis. In this case, the body may be angled. Preferably, the angle is at least 30°. Alternatively, the angle may be less than 60°. More preferably, the angle is between 40° and 50°.

In accordance with another preferred embodiment of the present invention, a method of fabricating an adjustable extension arm is provided. The method comprises casting a first channel member. The first channel member has a first end, a second end opposite the first end, a pair of sidewalls extending from the first end to the second end, and a bottom wall extending between the sidewalls. The pair of sidewalls has a substantially planar uninterrupted exterior face without parting lines. A second channel member is formed having a first end, a second end opposite the first end, a pair of sidewalls extending from the first end to the second end, and a bottom wall extending between the sidewalls. A first endcap is formed having first and second ends. A second endcap is formed having first and second ends. The first end of the first endcap is coupled to the first channel member about the first end thereof, and to the second channel member about the first end thereof. The first end of the second endcap is coupled to the first channel member about the second end thereof and to the second channel member about the second end thereof.

In an alternative, the method further comprises forming a forearm extension having a first end, a second end opposite the first end, a pair of sidewalls extending from the first end to the second end, and a bottom wall extending between the sidewalls. The first end of the forearm extension is coupled to the second end of the second endcap. In another alternative, casting the first channel member includes forming a reinforcement structure integral with the bottom wall.

BRIEF DESCRIPTION OF THE DRAWINGS

FIGS. 9(a)-(i) illustrate an upper channel of an extension arm in accordance with aspects of the present invention.

DETAILED DESCRIPTION

The aspects, features and advantages of the present invention will be appreciated when considered with reference to the following description of preferred embodiments and accompanying figures. In describing the preferred embodiments of the invention illustrated in the figures, specific terminology will be used for the sake of clarity. However, the invention is not intended to be limited to the specific terms so selected, and it is to be understood that each term selected includes all technical equivalents that operate in a similar manner to accomplish a similar purpose.

Figure 8:
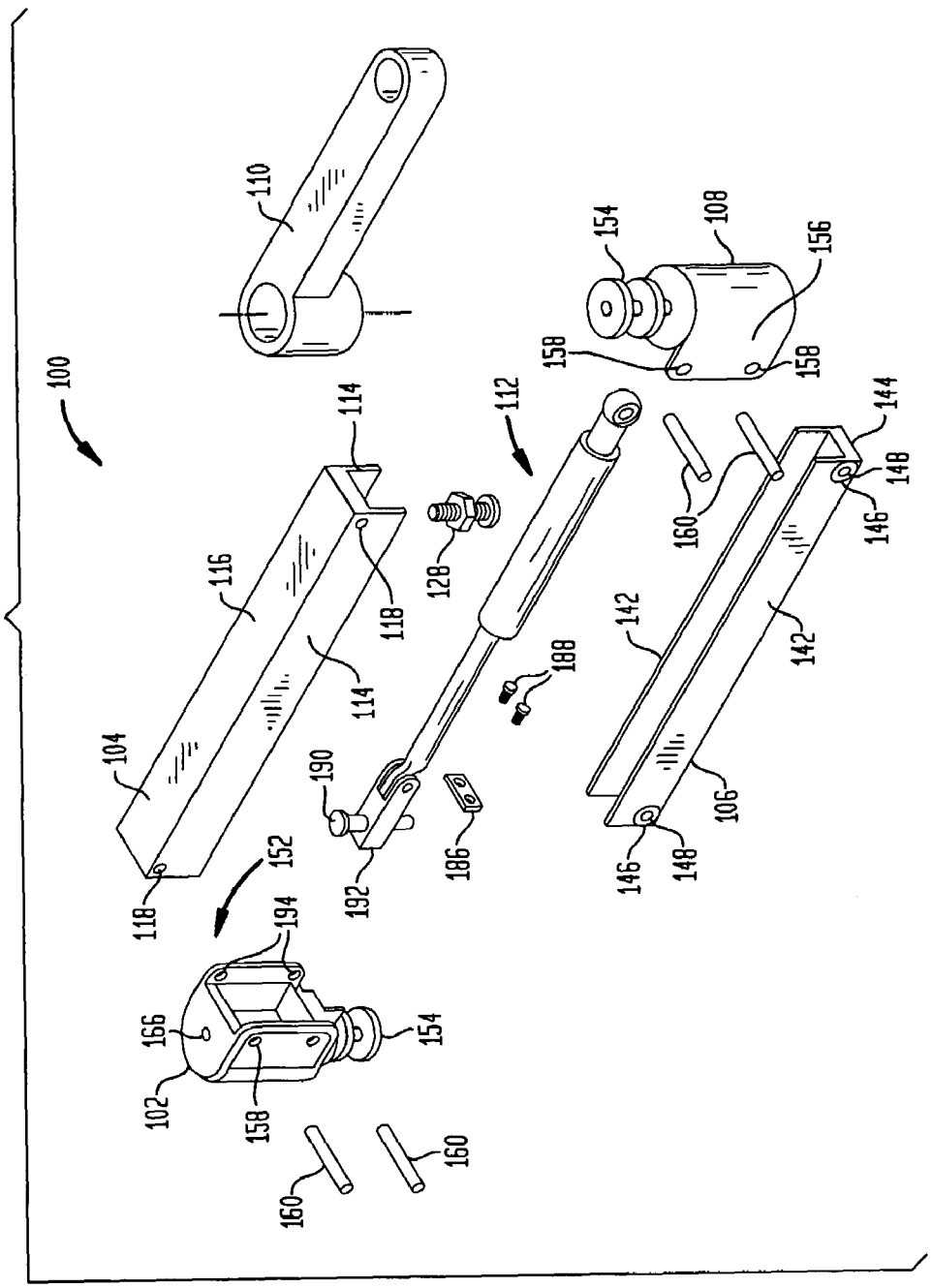
FIG. 8 is an exploded assembly drawing of an extension arm in accordance with aspects of the present invention.

FIG. 8 illustrates an exploded view of an extension arm 100 in accordance with aspects of the present invention. As shown in the figure, the extension arm 100 preferably includes a first endcap 102, an upper channel 104, a lower channel 106, a second endcap 108, and a forearm extension 110. A device such as a computer monitor or flat screen television can be mounted to the forearm extension 110. Alternatively, the device can also be mounted to the second endcap 108 or another component such as a tilting apparatus attached to the second endcap 108 or the forearm extension 110, as described in U.S. application Ser. No. 10/461,637, entitled "Tilter Apparatus for Electronic Device Having Bias Assembly," and U.S. Pat. No. 6,505,988, entitled "Tilter for Positioning Electronic Devices," the entire disclosures of which are hereby incorporated by reference. An extension and retraction means, such as a gas spring 112, permits the extension arm 100 to be adjusted and to retain a selected configuration. The gas spring 112 connects to the upper channel 104 and the first endcap 102, as will be described below. The gas spring 112 may operate in the same manner as the conventional gas spring 28 discussed above.

Figure 9A:

The upper channel 104 preferably has a generally U-shaped body including a pair of sidewalls 114 and a cover 116. The cover 116 extends between the pair of sidewalls 114 along the length of the upper channel 104. The upper channel 104 is illustrated in more detail in FIGS. 9(a)-(i). In order to avoid parting lines that are present in conventional cast upper channels, the sidewalls 114 in a preferred embodiment do not include cast or welded-on rollers. Instead, the sidewalls 114 are substantially flat or smooth, and have holes 118 at both ends. See FIG. 9(a). The ends adjacent the holes 118 are preferably rounded to avoid sharp corners and to avoid impingement of the first and second endcaps 102, 108. The flat sidewalls 114 can be easily fabricated by well-known manufacturing techniques.

A reinforcement structure 120 is desirably located in the interior of the upper channel 104, as an exterior structure would be visible to end-users. FIG. 9(c) illustrates a bottom-up view of the upper channel 104 showing the reinforcement structure 120. The reinforcement structure 120 is preferably integrally formed with the cover 116 by, e.g., cast molding, or otherwise attached thereto as a separate assembly. The reinforcement structure 120 preferably comprises a series of raised ribs 122 and spaces 124 arranged to form, e.g., a honeycomb, trellis, cellular or generally cross-ribbed structure. Cross-ribbed reinforcement structures are referred to herein as "crossribs." The reinforcement structure could also comprise a continuous or otherwise non-ribbed structure. FIG. 9(c) also shows a support or receptacle 126 within the cover 116 adapted to receive a ball stud 128 (FIG. 8) for attaching the upper channel 104 to the gas spring 112. The ball stud 128 may threadedly engage the receptacle 126. In an alternative, the ball stud 128 may be cast or otherwise integrally formed with the receptacle 126 as part of the upper channel 104. Preferably, the receptacle 126 (or the integrally formed receptacle/ball stud assembly) includes reinforcement 120a. The reinforcement 120a provides added strength and helps to reduce the stresses on the ball stud 128. The reinforcement 120a may be part of or separate from the reinforcement structure 120. The reinforcement 120a preferably extends to one or both of the sidewalls 114, and/or to endwall 121.

If the reinforcement structure 120 is located in the interior of the upper channel 104, it necessarily takes up space inside the U-shaped body. As discussed earlier, this is undesirable as it limits the range of motion of the extension means or gas spring 112. Therefore, in accordance with a preferred embodiment of the present invention, the reinforcement structure 120 tapers from one end of the upper channel 104 to the other end of the upper channel 104. However, in other embodiments it is contemplated that tapering from end to end may be omitted.

Figure 9B:
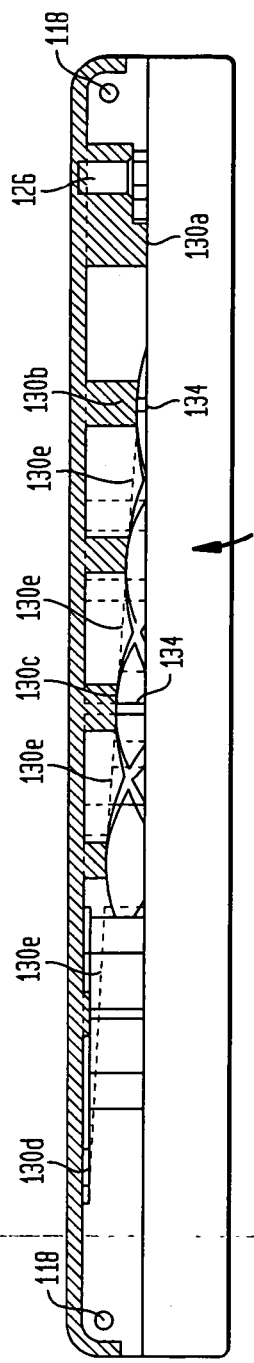
Figure 9C:
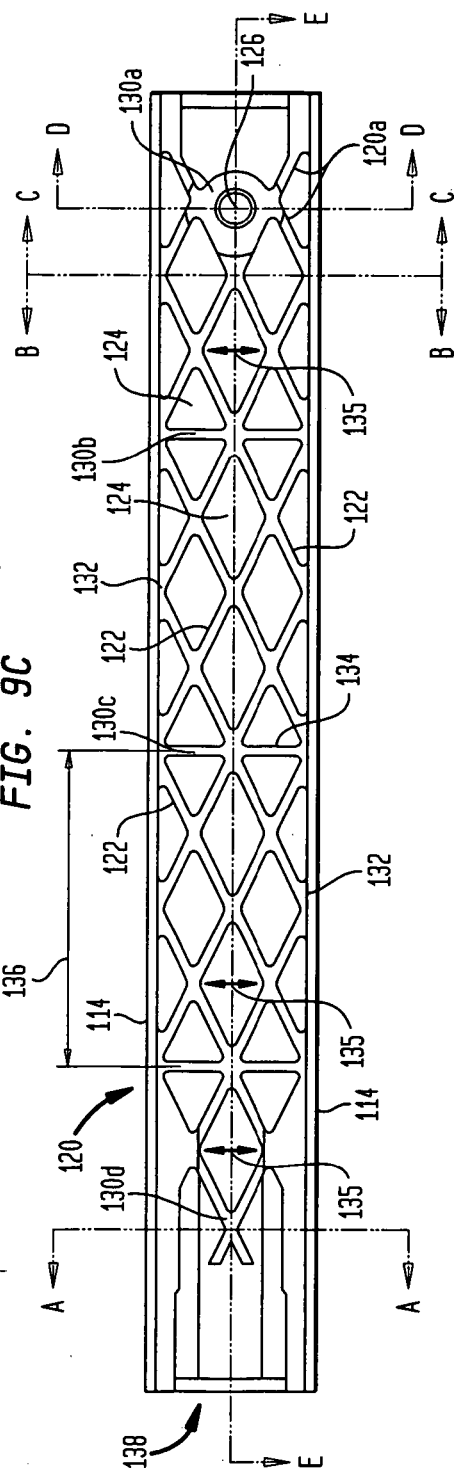

FIG. 9(b) illustrates a cutaway view along section line E-E of FIG. 9(c). The reinforcement structure 120 is at its deepest or fullest at point 130a, decreasing in thickness across the length of the upper channel 104 through, e.g., points 130b, 130c and 130d. Dashed line 130e shows a general taper progression from point 130a through 130d. The tapering may be, for example, on the order of three (3) degrees. Depending upon the overall length of the upper channel 104, the tapering is preferably between one (1) and five (5) degrees, although no maximum or minimum limits are required. Furthermore, the degree of tapering need not be uniform along the length of the reinforcement structure 120. Thus, for example, the tapering may increase or decrease at certain points depending upon the structural requirements and/or the type of extension means employed. The reinforcement structure 120 need not be continuous along the length of the upper channel 114. For example, as seen in FIGS. 9(i)(1) and 9(i)(2), the reinforcement structure 120 may be formed of two or more distinct steps 137, e.g., 137(a)-(d). As seen in the cutaway view of FIG. 9(i)(2) at section F-F, the steps can vary in thickness, and preferably taper in thickness as they progress along the length of the upper channel 114, getting thinner as shown by the progression of dashed line 130(e) of the upper channel 114 from 137(a) to 137(d).

Cutaway views 9(d)-(g) illustrate the tapered structure at sections A-A, B-B, C-C and D-D, respectively. The crossribs or other reinforcement structure 120 desirably extends along at least 50% of the length of the upper channel 104. In one alternative, they extend the entire length. In another alternative, they extend at least 75% of the total length. As seen in FIG. 9(c), the crossribs 120 extend approximately 85% of the entire length.

Preferably, the crossribs or other reinforcement structure 120 span the width of the upper channel 104, attaching to both sidewalls 114 at points 132 along the length. The ribs 122 may include one or more spanning members 134 to provide enhanced lateral support. The spanning members 134 are desirably arcuate or otherwise curved, tapering along the central portion 135. The spanning members 134 are preferably placed at some or all of the points 132. Regions between pairs of spanning members 134 are referred to as "crossrib cells" 136. In a preferred embodiment, the reinforcement structure 120 tapers from one end to the other end along a central portion 135 of the upper channel 104, but does not taper in the areas adjacent to the sidewalls 114. This transverse tapering provides extra support along the sidewalls 114 while opening additional space in the interior of the upper channel 104 to permit full extension of the gas spring 112. The transverse tapering across the width of the upper channel 114 may be used in combination with the lengthwise tapering from one end of the upper channel 114 to the other end. Alternative embodiments may employ only the transverse tapering. In a preferred embodiment the transverse tapering is arcuate or otherwise curved, with the greatest amount of tapering along the central portion 135. The amount of transverse tapering depends on the size and configuration of the gas spring 112 or other extension/retraction device.

Figure 9D:
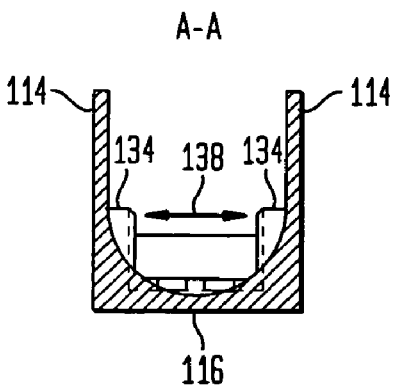
Figure 9E:
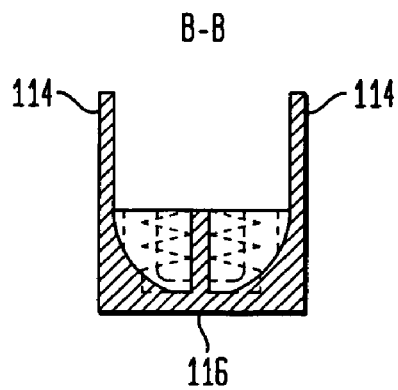
Figure 9F:
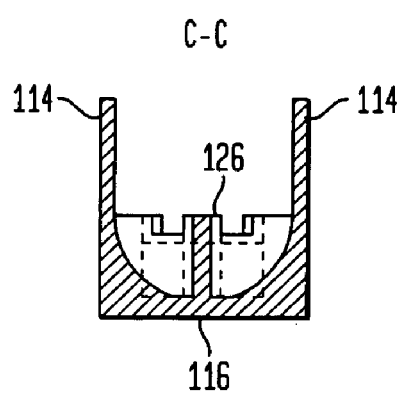
Figure 9G:
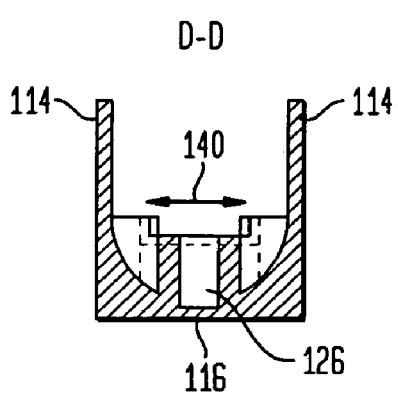
Figure 9H:
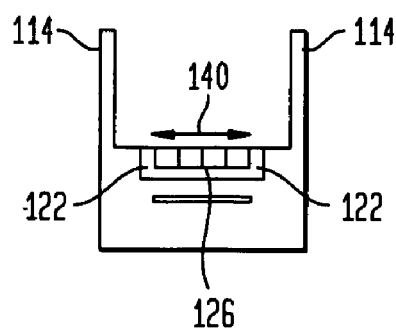

As seen in FIG. 9(d), the first end of the upper channel 104, opposite the second end of the upper channel 104 having receptacle 126 and ball stud 128, preferably includes a central recess 138. The central recess 138 may be wider, narrower or about the same size as the central portion 135. The central recess 138 desirably extends down to a point just above the holes 118 in the sidewalls. The central recess 138 permits additional movement of the gas spring 112, thereby allowing further extension or orientation of the extension arm 100. FIG. 9(h) illustrates the second end of the upper channel 104. As seen in FIG. 9(h), the second end may include a central recess 140 similar or identical to the central recess 138. The central recess 140 provides a space so that the upper channel 104 does not impinge upon the gas spring 112.

Figure 10A:
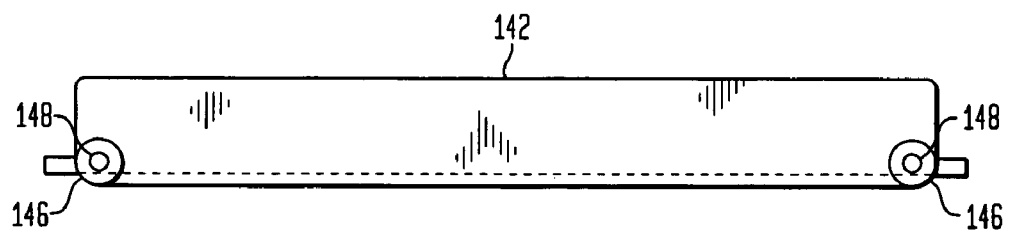
FIGS. 10(a)-(c) illustrate a lower channel of an extension arm in accordance with aspects of the present invention.
Figure 10B:
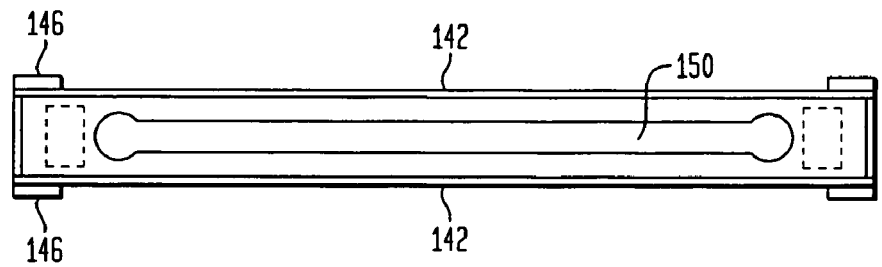
Figure 10C:
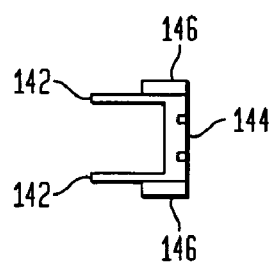

The lower channel 106 is generally similar to the upper channel 104. The lower channel 106 preferably has a generally U-shaped body including a pair of sidewalls 142 and a cover or base 144 that preferably extends between the pair of sidewalls 142 the length of the lower channel 106 (FIG. 8). The lower channel 106 is illustrated in more detail in FIGS. 10(a)-(c). It is possible to fabricate the lower channel 106 to have the same features as the upper channel 104, namely substantially flat sidewalls and/or a reinforcement structure. However, this is not necessary.

Preferably, the lower channel 106 has a width smaller than the upper channel 104. The lower channel 106 can then be at least partly nested inside the upper channel 104. If the lower channel 106 is nested inside the upper channel 104, parting lines, if any, will be hidden by the upper channel's sidewalls 114. Thus, the lower channel's sidewalls 142 can be fabricated to include bushings or cast rollers 146 (hereinafter bushings) having holes 148 therein, which may be cast or subsequently drilled.

Figure 1:
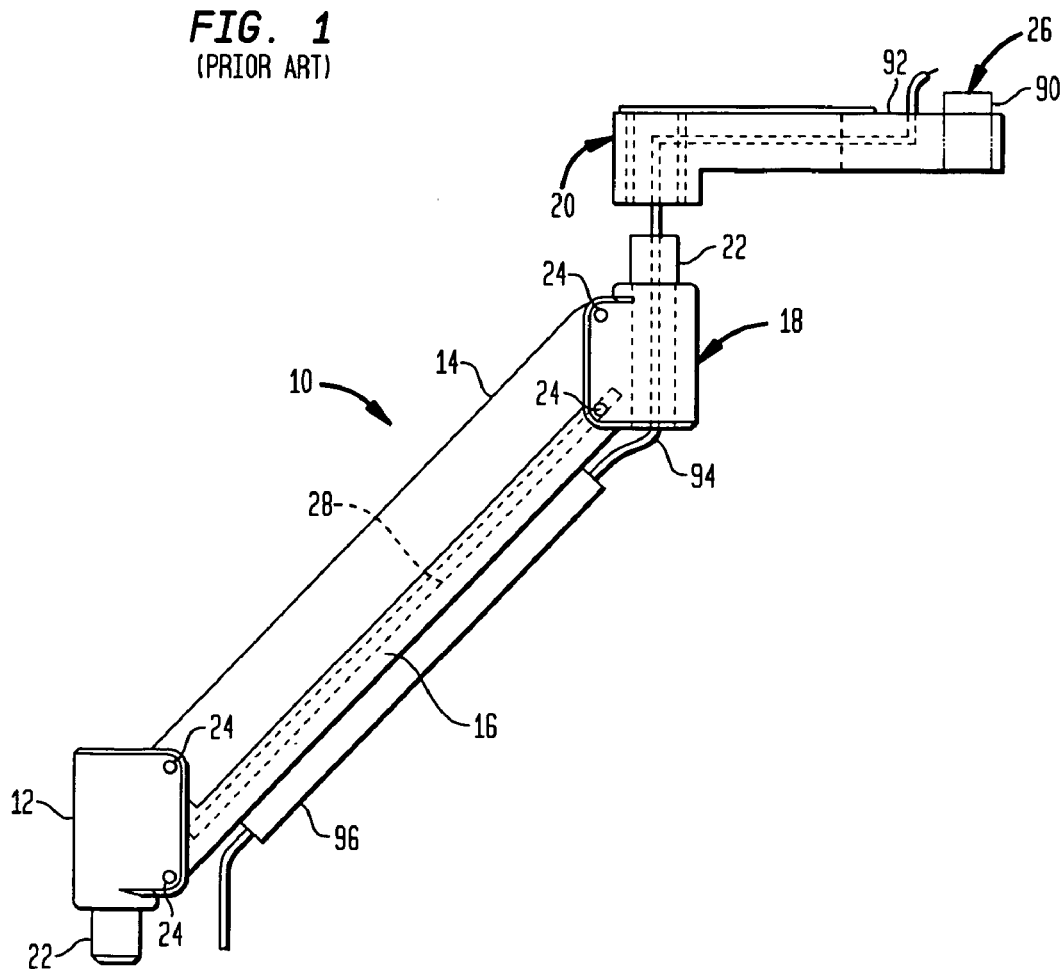
FIG. 1 is an assembly drawing of a conventional extension arm for mounting a computer monitor.
Figure 2:
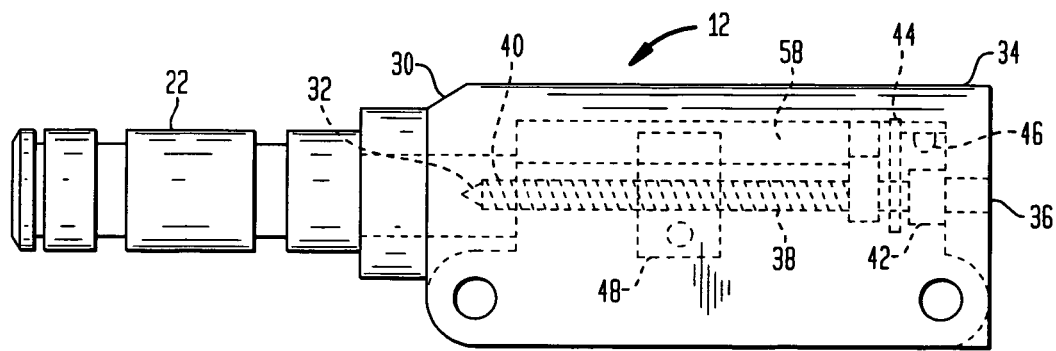
FIG. 2 illustrates a first endcap of a conventional extension arm.
Figure 3:
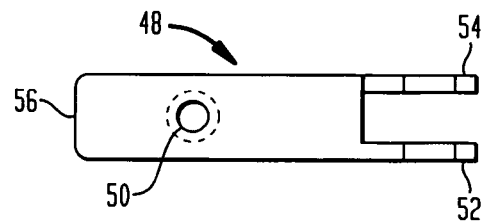
FIG. 3 illustrates the clevis assembly of a conventional extension arm.
Figure 4A:
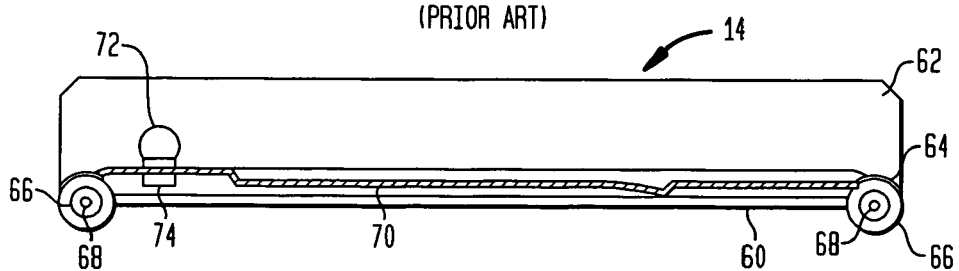
FIGS. 4(a)-(d) illustrate the upper channel of a conventional extension arm.
Figure 4B:
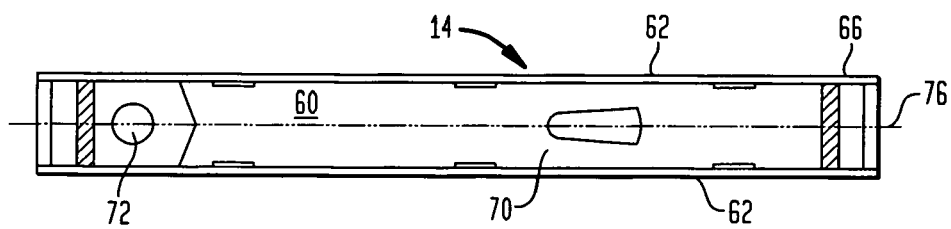
Figure 5A:
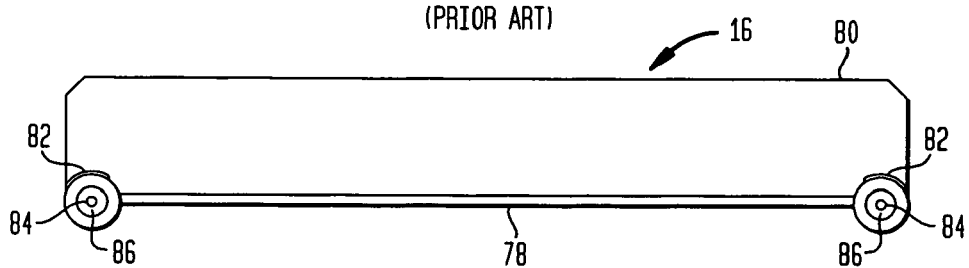
FIGS. 5(a)-(b) illustrate the lower channel of a conventional extension arm.
Figure 5B:
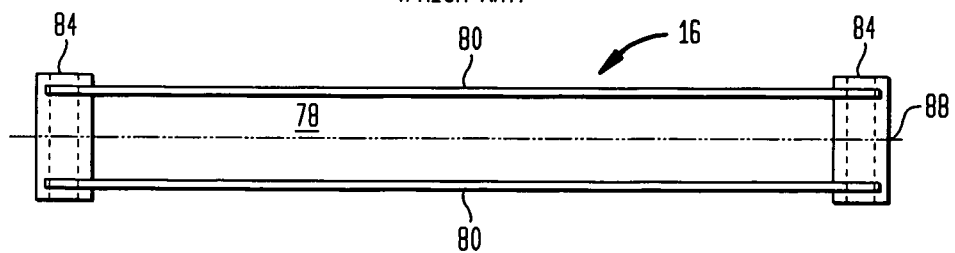
Figure 4C:
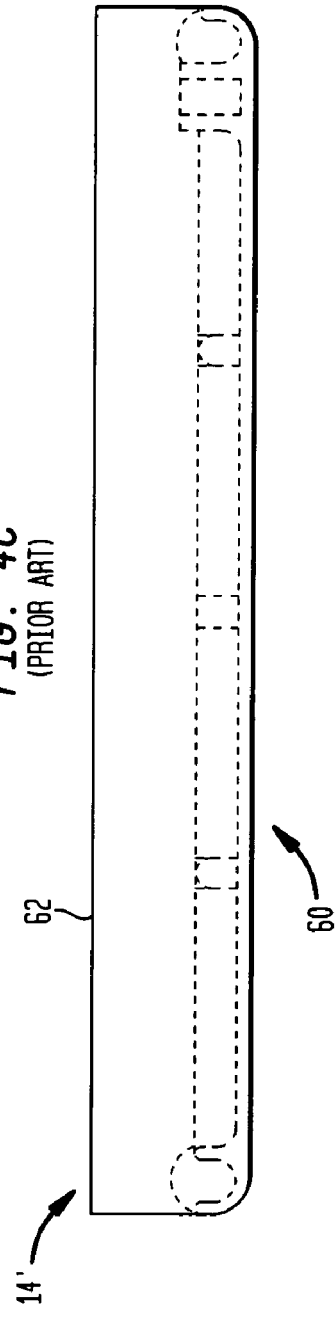
Figure 4D:
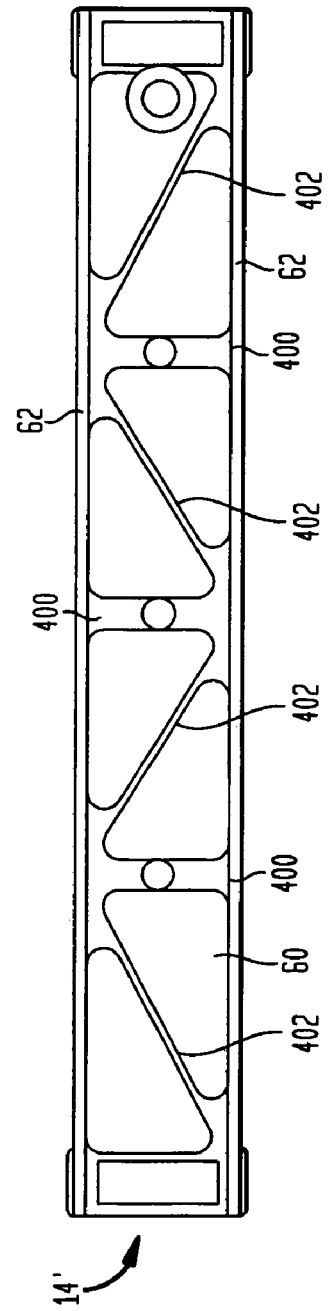
Figure 6:
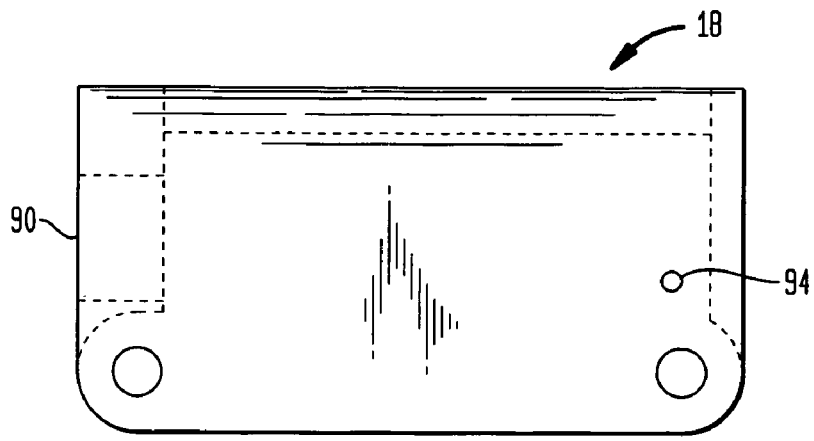
FIG. 6 illustrates a second endcap of a conventional extension arm.
Figure 7A:
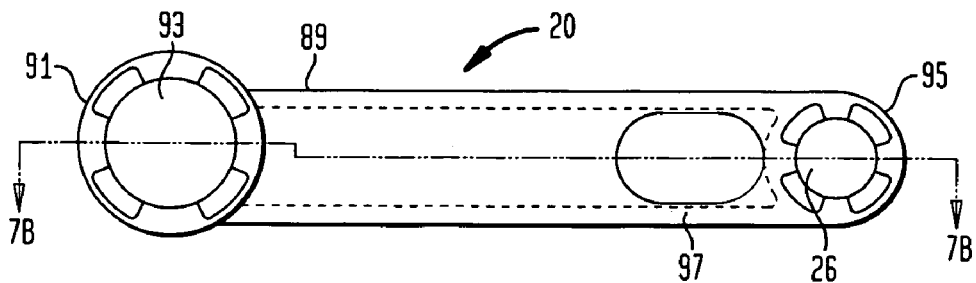
FIGS. 7(a)-(b) illustrates a forearm extension of a conventional extension arm.
Figure 7B:
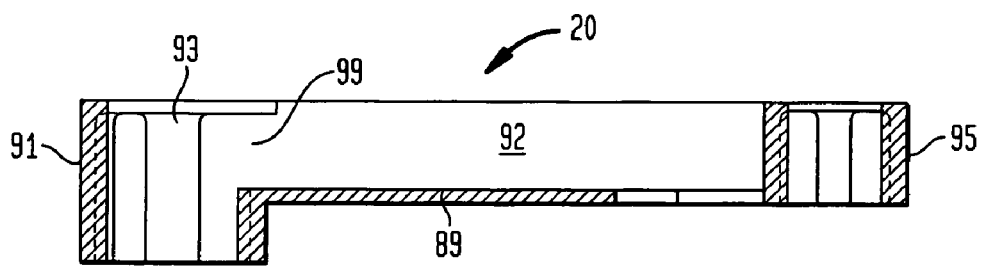

Unlike the upper channel 104, the lower channel 106 is preferably not directly connected to the extension means 112. Thus, the lower channel 104 is non-load bearing, and does not need the reinforcement structure 120 of the upper channel 104. Preferably, the lower channel 106 includes a contoured region 150. The contoured region 150 provides an open space in which a component, such as a cable clamp (not shown) can be inserted. The cable clamp (such as sheath 96 of FIG. 1) is used to retain a cable of the device mounted on the extension arm 100. Of course, it should be understood in alternative embodiments that the functions and operations of the upper channel 104 and the lower channel 106 may be reversed. In such cases, the lower channel may include the reinforcement structure 120, smooth exterior sidewalls 142, and receptacle 126 adapted to connect to the extension means 112.

FIGS. 11(a)-(f) illustrate the endcaps 102, 108 in more detail. The first and second endcaps 102, 108 each preferably include a partly enclosed housing 152 at a first end and a shaft 154 at a second end. As seen in the side view of FIG. 11(a), the housing 152 preferably includes a sidewall 156 having holes 158 to receive connection means, such as pins 160 (FIG. 8). The pins 160 may be inserted through the holes 158 and through the holes 118 in the upper channel 104 and the holes 148 in the lower channel 106. The operation of the upper and lower channels 104, 106 and the first and second endcaps 102, 108 are further described below.

Figure 11A:
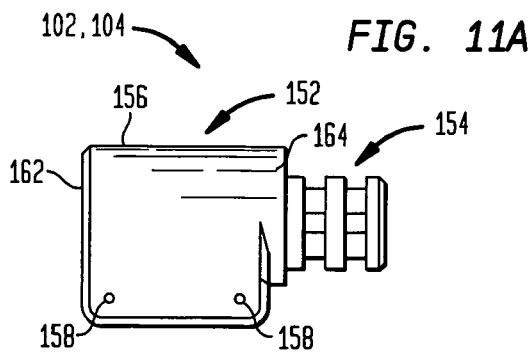
FIGS. 11(a)-(f) illustrate an endcap of an extension arm in accordance with aspects of the present invention.
Figure 11B:
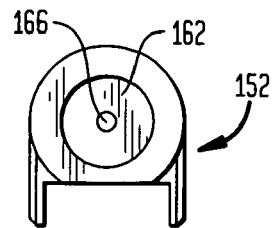
Figure 11C:
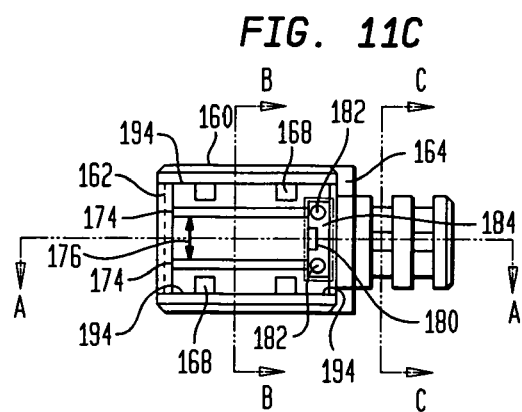
Figure 11F:
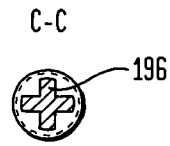

FIG. 11(c) is a frontal view showing the open region within the partly enclosed housing 152, which is generally formed by the sidewall 156 and oppositely-disposed upper and lower endwalls 162, 164, respectively. The sidewall 156 extends partly around the partially-enclosed housing 152 so as to permit manipulation of components to be assembled within the first and second endcaps 102, 108. The upper endwall 162 preferably includes a hole 166 disposed therethrough. See FIG. 11(b).

Figure 11D:
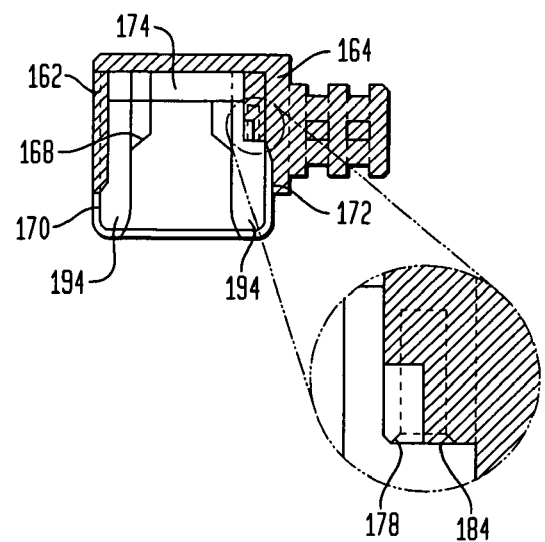

Returning to FIG. 11(c), the interior of the housing 152 preferably includes one or more stops 168. The stops 168 are employed to stop upward or downward movement of the extension arm 100 when the ends of the upper and lower channels 104, 106 contact the stops 168. The cutaway view along section A-A in FIG. 11(d) shows the stops 168 in more detail. The ends of the stops 168 are preferably angled to between 15-75 degrees. More preferably, the ends of the upper and lower stops 168 are all angled at about 45 degrees. Angling is preferred because the tapered reinforcement structure 120 and the central recess 138 of the upper channel 104 permits extra extension of the gas spring 112. Therefore, the angle permits fuller upward or downward movement of the extension arm 100. The outer edges 170, 172 of the upper and lower endwalls 162, 164, respectively are preferably angled to avoid contact with the upper and lower channels 104, 106.

Figure 11E:
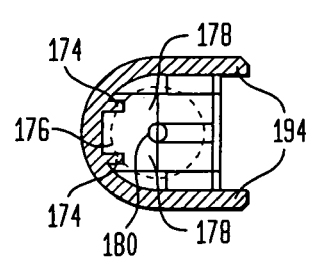

FIG. 11(e) illustrates a cutaway view along section B-B. This figure shows trough walls 174 that run longitudinally along the inner surface of the sidewall 156 between the upper and lower endwalls 162, 164. The trough walls 174 are preferably integrally molded to the inner surface of the sidewall 156. The trough walls 174 define a trough 176 therebetween. Additionally within the partially enclosed housing 152 and integrally molded with the inner surface of the sidewall 156 and proximate the lower endwall 164, are shelves 178. The shelves 178 are partly separated by a groove 180. See also FIG. 11(c). The shelves preferably have a connecting front face 184 and connection means, such as self-tapping screw holes 182, disposed therein. The front face 184 is configured to engage a retainer clip 186 by means of fasteners (e.g., screws) 188. See FIG. 8. When the retainer clip 186 is fastened in place, the groove 180 defines a place for accepting one end of a threaded rod 190. The threaded rod, e.g., threadedly engages a clevis 192, thereby connecting the gas spring 112 to the first endcap 102. The operation of the gas spring 112, including the clevis 192, is well known and fully described in U.S. Pat. No. 6,478,274 and will not be described further herein.

The first and second endcaps 102, 108 preferably include bosses 194 on the interior of the sidewall 156. The bosses 194 are located around where the holes 158 are positioned. The bosses 194 are preferably integrally molded with the interior of the sidewall 156. A first set of the bosses 194 act as spacers or washers to provide a clearance between the sidewall 156 of the endcaps 102, 108 and the outer faces of the sidewalls 114 of the upper channel 104. A second set of the bosses 194 act as spacers or washers to provide a clearance between the sidewall 156 and the bosses 146 of the lower channel 106. The bosses 194 are preferably less than three millimeters thick. The clearance need not be overly large. For instance, the clearance may be between about 0.25 and 3.0 millimeters. In an alternative, the clearance is at least 0.5 millimeters. In another alternative, the clearance is less than 2.0 millimeters. More preferably, the bosses 194 are dimensioned to provide a clearance of about one millimeter. Because the bosses 194 provide clearance, they permit the outer faces of the upper channel sidewalls 114 (and/or the outer faces of the lower channel sidewalls 142) to be fabricated with a substantially planar uninterrupted exterior face. This provides a smooth appearance and avoids parting lines.

The shaft 154 is preferably integrally molded to the lower endwall 164. The shaft 154 of the first endcap 102 may be pivotally connected to a support structure such as, e.g., a desk, wall, pole mount or other mounting structure. The shaft 154 of the second endcap 108 preferably connects to the forearm extension 110. The shafts 154 of the first and second endcaps 102, 108 may be the same or may differ depending upon how or what they connect to. Portions of the shaft 154 may have an X or cross shape 196, as seen in section C-C of FIG. 11(f). The cross shape 196 is especially desirable when the endcap 102 and/or the endcap 108 are formed using a casting process. The cross shape 196 promotes uniform wall thickness and a lower cost of materials.

Figure 12A:
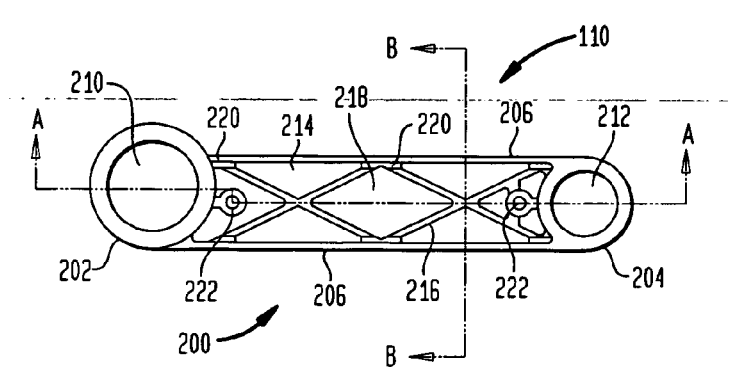
FIGS. 12(a)-(c) illustrate a forearm extension of an extension arm in accordance with aspects of the present invention.
Figure 12B:
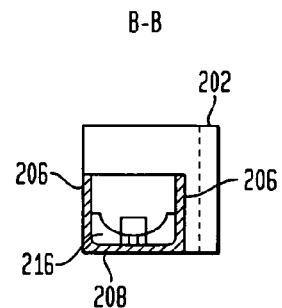
Figure 12C:
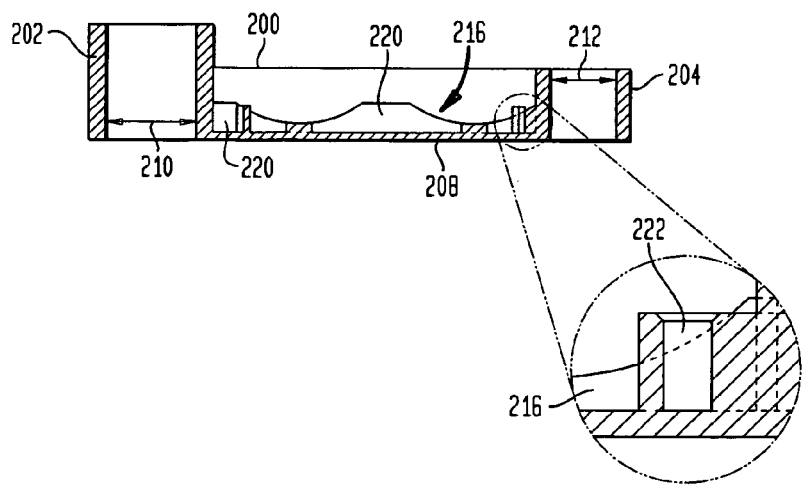

FIGS. 12(a)-(c) illustrate a preferred embodiment of the forearm extension 110. The forearm extension includes an extended body 200 having couplings 202, 204 disposed at either end. The body 200 is preferably U-shaped, having a pair of sidewalls 206 and a cover 208 attached to both sidewalls along the length of the body 200, as seen in the cutaway view B-B of FIG. 12(b). The U-shape allows a cable of an electronic device to be hidden by the forearm extension 110. The couplings 202, 204 are preferably female couplings. The coupling 202 has an inner opening 210 that is sized to rotatably engage the shaft 154 of the second endcap 108. The coupling 204 has an inner opening 212 that is sized to rotatably engage a tilter, platform or other connection means attached to an electronic device such as a flat panel video display.

The forearm extension 110 can be securely attached to the second endcap 108 by engaging the coupling 202 to the shaft 154. A bushing (not shown) may be placed over the shaft 154 and slid into the inner diameter 210. If a bushing is used, it is preferably a smooth material, such as plastic, that reduces friction and metal-to-metal contact between the coupling 202 and the shaft 154. The coupling 202 may include a hole (not shown) adapted to receive a set screw (not shown). The set screw may be adjusted to press into the bushing, causing the bushing to flex inward and creating frictional pressure on the shaft 154. The frictional pressure prevents the shaft 154 from rotating within the coupling 202. The coupling 204 functions in a similar manner.

The extended body 200 preferably includes crossribs or another reinforcement structure 214 to provide enhanced support to the forearm extension 110. As with the reinforcement structure 120, the reinforcement structure 214 preferably comprises a series of ribs 216 and spaces 218 in a crossrib-type arrangement. The reinforcement structure 214 may be integral with the extended body 200 and formed, e.g., by cast molding. Preferably, the crossribs or other reinforcement structure 214 span the width of the forearm extension 110, attaching to both sidewalls 206 at points 220 along the length. The ribs 216 need not be uniform along the length of the extended body 200, as seen in the cutaway view A-A of FIG. 12(c). While the reinforcement structure 120 is tapered to allow the gas spring or extension means 112 to operate, there is no such requirement for tapering in the reinforcement structure 214 of the extension arm 110. However, transverse tapering between the sidewalls and/or longitudinal tapering along the length of the forearm extension 110 may be provided, for example, to save on the cost of materials or to provide additional interior space so that a cable of the device mounted on the extension arm can be hidden from view. Also, the reinforcement structure 214 may be provided in discrete steps along the length of the forearm extension 110. The extended body 200 may also include receptacles 222. The receptacles 222 are preferably adapted to receive screws or other fasteners for connecting a removable cover, cable sheath, or other component (not shown) over and/or inside the U-shaped body 200.

Figure 13A:
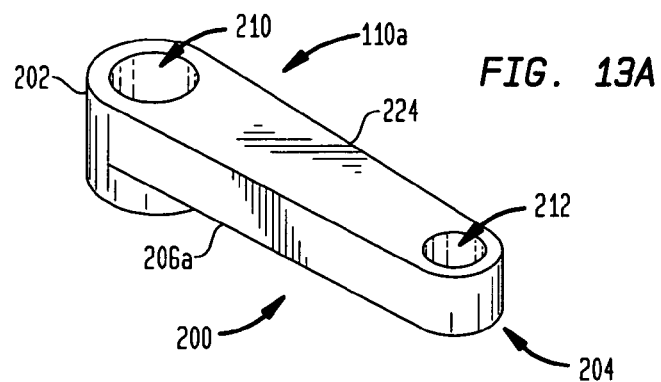
FIGS. 13(a)-(e) illustrate another forearm extension in accordance with aspects of the present invention.
Figure 13B:
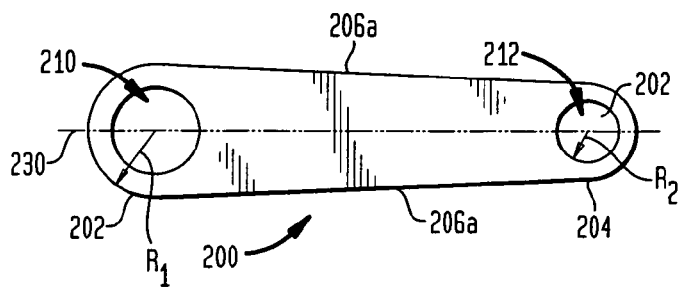
Figure 13C:
Figure 13E:
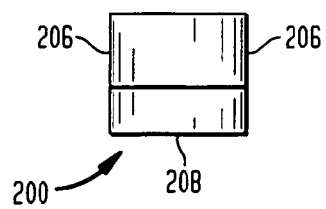
Figure 13D:
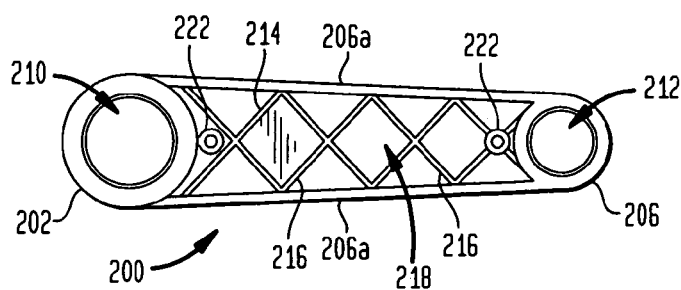
Figure 14A:
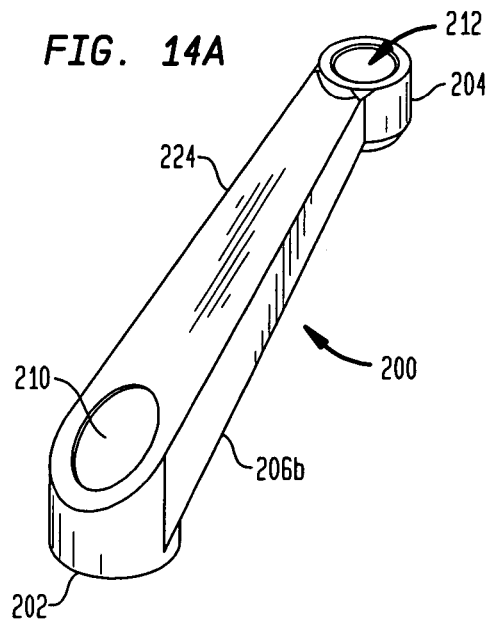
FIGS. 14(a)-(d) illustrate a further forearm extension in accordance with aspects of the present invention.
Figure 14B:
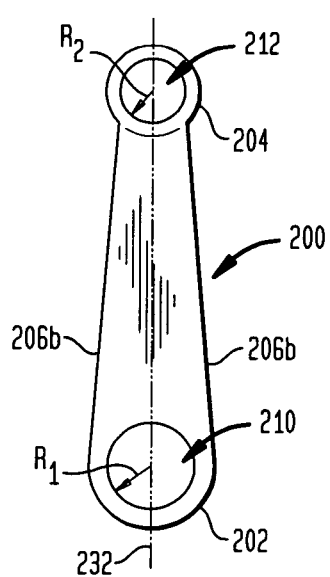
Figure 14D:
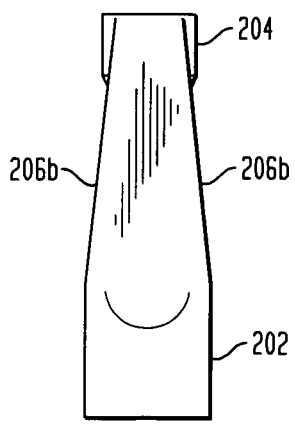
Figure 14C:
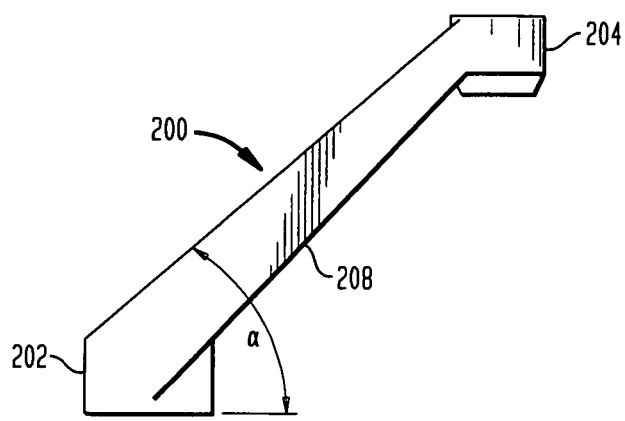

FIGS. 13(a)-(e) illustrate another preferred embodiment of the forearm extension 110, namely forearm extension 110(a). The forearm extension 110(a) is similar to the forearm extension 110 of FIGS. 12(a)-(c). The forearm extension 110(a) includes the extended body 200 having couplings 202, 204 disposed at either end. The body 200 is preferably U-shaped, having a pair of sidewalls 206(a) and a cover/base 208 attached to both sidewalls 206(a) along the length of the body 200, as seen in FIGS. 13(c) and 13(e). The U-shape allows a cable of an electronic device to be hidden by the forearm extension 110(a).

Unlike the forearm extension 110, the forearm extension 110(a) has a symmetrical shape along a central axis 230. See FIG. 13(b). The coupling 202 has an inner opening 210 with a radius of curvature $R_1$ and the coupling 204 has an inner opening 212 with a radius of curvature $R_2$. Preferably, $R_1$ is greater than $R_2$. The sidewalls 206(a) of the forearm extension 110(a) have the same length, flaring out from the coupling 204 toward the coupling 202. The sidewalls 206(a) desirably seamlessly blend into the couplings 202 and 204. The symmetrical shape, including the equal-length sidewalls 206(a), adds extra strength and support to the forearm extension 110(a), which can more effectively resist torque from the mounted device.

The couplings 202, 204 are preferably receptacles/female couplings. See FIG. 13(b). The inner opening 210 is sized to rotatably engage the shaft 154 of the second endcap 108. The inner opening 212 is sized to rotatably engage a tilter, platform or other connection means attached to an electronic device such as a flat panel video display.

The forearm extension 110(a) can be securely attached to the second endcap 108 by engaging the coupling 202 to the shaft 154. A bushing (not shown) may be placed over the shaft 154 and slid into the inner opening 210. If a bushing is used, it is preferably a smooth material, such as plastic, that reduces friction and metal-to-metal contact between the coupling 202 and the shaft 154. The coupling 202 may include a hole (not shown) adapted to receive a set screw (not shown). The set screw may be adjusted to press into the bushing, causing the bushing to flex inward and creating frictional pressure on the shaft 154. The frictional pressure prevents the shaft 154 from rotating within the coupling 202. The coupling 204 may function in a similar manner.

The extended body 200 preferably includes crossribs or another reinforcement structure 214 to provide enhanced support to the forearm extension 110(*a*). As described above with regard to the forearm extension 110, the reinforcement structure 214 of the forearm extension 110(*a*) preferably comprises a series of ribs 216 and spaces 218 in a crossrib-type arrangement. The reinforcement structure 214 may be integral with the extended body 200 and formed, for instance, by cast molding. Preferably, the crossribs or other reinforcement structure 214 span the width of the forearm extension 110(*a*), attaching to both sidewalls 206 at points 220 along the length. The ribs 216 need not be uniform along the length of the extended body 200. While the reinforcement structure 120 is tapered to allow the gas spring or extension means 112 to operate, there is no such requirement for tapering in the reinforcement structure 214 of the extension arm 110(*a*). However, transverse tapering between the sidewalls and/or longitudinal tapering along the length of the forearm extension 110(*a*) may be provided, for example, to save on the cost of materials or to provide additional interior space so that a cable of the device mounted on the extension arm can be hidden from view. Also, the reinforcement structure 214 may be provided in discrete steps along the length of the forearm extension 110(*a*). The extended body 200 may also include receptacles 222. The receptacles 222 are preferably adapted to receive screws or other fasteners for connecting a removable cover 224 or other component such as a cable sheath, which can fit over and/or inside the U-shaped body 200.

FIGS. 14(*a*)-(*d*) illustrate yet another preferred embodiment of the forearm extension 110, namely forearm extension 110(*b*). The forearm extension 110(*b*) is similar to the forearm extension 110(*a*) of FIGS. 13(*a*)-(*e*). The forearm extension 110(*b*) includes the extended body 200 having couplings 202, 204 disposed at either end. The body 200 is preferably U-shaped, having a pair of sidewalls 206(*b*) and a cover/base 208 attached to both sidewalls 206(*b*) along the length of the body 200, as seen in FIG. 14(*c*). The U-shape allows a cable of an electronic device to be hidden by the forearm extension 110(*b*).

The couplings 202, 204 are preferably receptacles/female couplings. See FIG. 14(*b*). The coupling 202 has an inner opening 210 that is sized to rotatably engage the shaft 154 of the second endcap 108. The coupling 204 has an inner opening 212 that is sized to rotatably engage a tilter, platform or other connection means attached to an electronic device such as a flat panel video display.

The forearm extension 110(*b*) can be securely attached to the second endcap 108 by engaging the coupling 202 to the shaft 154. A bushing (not shown) may be placed over the shaft 154 and slid into the inner opening 210. If a bushing is used, it is preferably a smooth material, such as plastic, that reduces friction and metal-to-metal contact between the coupling 202 and the shaft 154. The coupling 202 may include a hole (not shown) adapted to receive a set screw (not shown). The set screw may be adjusted to press into the bushing, causing the bushing to flex inward and creating frictional pressure on the shaft 154. The frictional pressure prevents the shaft 154 from rotating within the coupling 202. The coupling 204 may function in a similar manner.

As with forearm extensions 110 and 110(*a*), the extended body 200 of forearm extension 110(*b*) preferably includes crossribs or another reinforcement structure 214 to provide enhanced support. The extended body 200 may also include receptacles (not shown). The receptacles are preferably adapted to receive screws or other fasteners for connecting the removable cover 224, a cable sheath or other component that can fit over and/or inside the U-shaped body 200. See FIG. 14(*a*).

As with the forearm extension 110(*a*), the forearm extension 110(*b*) has a symmetrical shape along a central axis 232. See FIG. 14(*b*). The inner opening 210 has a radius of curvature $R_1$ and the inner opening 212 has a radius of curvature $R_2$. Preferably, $R_1$ is greater than $R_2$. The sidewalls 206(*b*) of the forearm extension 110(*b*) have the same length, flaring out from the coupling 204 toward the coupling 202. The sidewalls 206(*b*) desirably seamlessly blend into the couplings 202 and 204. The symmetrical shape, including the equal-length sidewalls 206(*b*), adds extra strength and support to the forearm extension 110(*b*), which can more effectively resist torque from the mounted device.

Unlike the forearm extension 110(*a*), the body 200 of the forearm extension 110(*b*) is angled at some angle $\alpha$. See FIG. 14(*c*). The angle $\alpha$ can be any non-zero angle, depending upon the type of application required. In one example, the angle $\alpha$ may be between 20 and 70 degrees. In another example, the angle $\alpha$ is at least 30 degrees. In a further example, the angle $\alpha$ is less than 60 degrees. More preferably, the angle $\alpha$ is on the order of 45 degrees, for instance between 40 and 50 degrees.

Thus, it can be seen that the various aspects of the present invention provide significant improvements over previous extension arm designs. The upper and/or lower channels 104, 106 may be fabricated without parting lines. The interior bosses 194 of the endcaps 102, 108 provide spacing formerly required by exterior spacers on the upper channel 104. The stops 168 of the endcaps 102, 108 may have angled ends, permitting a full range of movement of the extension means 112. The reinforcement structures 120, 214 of the upper channel 104 and the forearm extension 110, respectively, are able to support heavy electronic devices such as large screen monitors. Furthermore, the tapered reinforcement structure 120 of the upper channel 104 contributes to the full range of motion of the extension means 112 without resorting to larger or longer extension arms.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An adjustable extension arm, comprising:
   a first channel member having a first end, a second end opposite the first end, and a pair of sidewalls extending from the first end to the second end;
   a second channel member having a first end, a second end opposite the first end, a pair of sidewalls extending from the first end to the second end;
   a first endcap having an interior surface and first and second ends, the first end including a plurality of bosses contacting the first and second channel members at the first ends thereof, the bosses of the first endcap providing a clearance between the interior surface of the first endcap and the sidewalls of the first and second channel members; and
   a second endcap having an interior surface and first and second ends, the first end including a plurality of bosses contacting the first and second channel members at the second ends thereof, the bosses of the second endcap providing the clearance between the interior surface of the second endcap and the sidewalls of the first and second channel members.

2. The adjustable extension arm of claim 1, wherein the first and second endcaps each include at least one stop for arresting movement of an extension and retraction means.

3. The adjustable extension arm of claim 2, wherein the stops of the first and second endcaps each include an angled end, wherein the angle permits an enhanced range of motion for the extension and retraction means.

4. The adjustable extension arm of claim 3, wherein the angle is between 15 to 75 degrees.

5. The adjustable extension arm of claim 1, wherein the bosses of the first endcap are integrally formed with the interior surface of the first endcap and the bosses of the second endcap are integrally formed with the interior surface of the second endcap.

6. The adjustable extension arm of claim 1, wherein the clearance is less than about three millimeters.

7. An adjustable extension arm, comprising:
a first channel member having a first end, a second end opposite the first end, and a pair of sidewalls extending from the first end to the second end, the pair of sidewalls having a substantially planar uninterrupted exterior face;
a second channel member having a first end, a second end opposite the first end, and a pair of sidewalls extending from the first end to the second end, the sidewalls including a plurality of bosses adjacent to the first and second ends;
a first endcap having an interior surface and first and second ends, the first end including a plurality of bosses, a first pair of the first endcap bosses contacting the substantially planar uninterrupted exterior faces of the first channel member about the first end thereof, the first pair of first endcap bosses providing a clearance between the interior surface of the first endcap and the substantially planar uninterrupted exterior faces of the first channel member, a second pair of the first endcap bosses contacting a pair of the second channel member bosses adjacent to the first end thereof; and
a second endcap having an interior surface and first and second ends, the first end including a plurality of bosses, a first pair of the second endcap bosses contacting the substantially planar uninterrupted exterior faces of the first channel member about the second end thereof, the first pair of second endcap bosses providing a clearance between the interior surface of the second endcap and the substantially planar uninterrupted exterior faces of the first channel member, a second pair of the second endcap bosses contacting a pair of the second channel member bosses adjacent to the second end thereof.

8. The adjustable extension arm of claim 7, wherein the first and the second endcaps each include at least one stop for arresting movement of an extension and retraction means.

9. The adjustable extension arm of claim 8, wherein the stops of the first and second endcaps each include an angled end, wherein the angle permits an enhanced range of motion for the extension and retraction means.

10. The adjustable extension arm of claim 9, wherein the angle is between 15 to 75 degrees.

11. The adjustable extension arm of claim 7, wherein the bosses of the first endcap are integrally formed with the interior surface of the first endcap and the bosses of the second endcap are integrally formed with the interior surface of the second endcap.

12. The adjustable extension arm of claim 7, wherein the clearance is less than about three millimeters.

\* \* \* \* \*